April 18, 1967   R. J. SOLLOHUB   3,314,273
PROCESS FOR MAKING SPLIT RIMMED RINGS
Filed March 12, 1964   7 Sheets-Sheet 1

INVENTOR.
Raymond J. Sollohub,
BY Henry J. Murciniak
Attorney

INVENTOR.
Raymond J. Sollohub,
BY *Henry J. Marcinik*
Attorney.

April 18, 1967  R. J. SOLLOHUB  3,314,273
PROCESS FOR MAKING SPLIT RIMMED RINGS
Filed March 12, 1964  7 Sheets-Sheet 4

INVENTOR.
Raymond J. Sollohub,
BY Henry J. Marciniak
Attorney.

April 18, 1967   R. J. SOLLOHUB   3,314,273
PROCESS FOR MAKING SPLIT RIMMED RINGS
Filed March 12, 1964   7 Sheets-Sheet 5

INVENTOR.
Raymond J. Sollohub,
BY Henry J. Marciniak
Attorney.

April 18, 1967 R. J. SOLLOHUB 3,314,273
PROCESS FOR MAKING SPLIT RIMMED RINGS
Filed March 12, 1964 7 Sheets-Sheet 7

INVENTOR.
Raymond J. Sollohub,
BY Henry J. Maciniak
Attorney.

3,314,273
Patented Apr. 18, 1967

3,314,273
PROCESS FOR MAKING SPLIT RIMMED RINGS

Raymond J. Sollohub, Linton, Ind., assignor to General Electric Company, a corporation of New York
Filed Mar. 12, 1964, Ser. No. 351,404
6 Claims. (Cl. 72—335)

This invention relates to a method of making split rimmed rings and more particularly to such split rimmed rings specially adapted for use in conjunction with a resilient support assembly for fractional horsepower motors.

In the production of parts for mass-produced products, such as small fractional horsepower motors, it is desirable for reasons of economy, that the process used to fabricate these parts be readily adapted to automated or semiautomated manufacturing techniques. The problems associated with developing such a process for fabricating metallic rimmed rings used in the resilient support assemblies of fractional horsepower motors has been complicated by the requirement in some applications that the rings be provided with radially extending tabs and that these rings be readily mounted on a resilient rubber annulus.

Accordingly, a general object of the present invention is to provide an improved process for making split rimmed rings.

It is a more specific object of the present invention to make split rimmed rings by an improved process that is readily adapted to automated and semi-automated manufacturing techniques.

Another object of the present invention is to provide an improved process for making split rimmed rings for use in a resilient support assembly of a motor wherein radially extending tabs are provided for engagement with the resilient annulus of the support assembly.

Another object of the present invention is to provide an improved process for making split rimmed rings with tabs wherein the rings can be fabricated in a continuous series of forming operations.

In accordance with one form of my invention I have provided an improved process for making split rimmed rings having a predetermined radius and circumferential length. To fabricate the split rimmed ring an elongated flat piece is initially cut from metallic strip material to a length essentially equal to the predetermined circumferential length of the ring. The flat metallic piece is then formed into a channel-shaped piece, and a plurality of tabs are punched or cut out from the web portion of the channel-shaped piece. In the next forming operation an essentially 90 degree bend is formed at each end of the channel-shaped piece to provide an angulated channel-shaped piece. The radius of the bend at each end is essentially equal to the predetermined radius of the split rimmed ring. In the final forming step two additional 90 degree bends are effected to shape the angulated piece into a ring of the predetermined radius.

According to a more specific aspect of the invention spring loaded dies are preferably used in a number of the forming operations to effect a return of the work piece to a preselected datum plane. Preferably, the flat elongated piece is formed into a channel-shaped piece in a spring-loaded die. Upon completion of the forming operation the spring-loaded die causes the channel-shaped piece to return to the preselected datum plane. The channel-shaped piece is then transferred along the datum plane to a second spring-loaded die where a plurality of tabs are formed in the channel-shaped piece. The second spring-loaded die effects a return of the tabbed channel-shaped piece to the preselected datum plane. The channel-shaped piece is transferred along the datum plane to a third die, which may also be a spring-loaded die. At this forming station the channel-shaped piece is formed into an angulated channel-shaped piece having a 90 degree bend at each end with a radius essentially equal to the predetermined radius of the split rimmed ring. Upon completion of the latter forming operation the piece is again returned to the datum plane and transferred along the datum plane to a fourth die where two more ninety degree bends are effected to shape the angulated channel-shaped piece into a split rimmed ring with the predetermined radius.

An important advantage of the improved process is that the process is readily adaptable to automated fabricating techniques. Upon completion of one of forming operations the piece is returned to a common datum plane where it can be readily handled and transferred to the next forming station. Further, the improved process permits the transfer to be effected by conventional transfer mechanisms.

Further aspects and advantages of the invention will become apparent from the more detailed description of the invention. It will be understood that the specification concludes with claims which particularly point out and distinctly claim the subject matter which I regard as my invention. The invention, however, both as to organization and method of operation, together with further objects and advantages thereof, may be best understood by reference to the following description taken in conjunction with the accompanying drawing in which:

Having specific reference to FIGURES 1-5, I have illustrated therein diagrammatically how the steps in the method of embodying one form of my invention are carried out. It will be seen in FIGURE 1 that the flat elongated piece 10 is formed or cut from metallic strip material 11, which in illustrated embodiment of the invention was aluminum. The metallic strip material 11 is notched at each side by the punches 12 and 13. It was found that the notches 14 and 15 facilitated the cutting of the elongated flat pieces 10.

Figure 1:
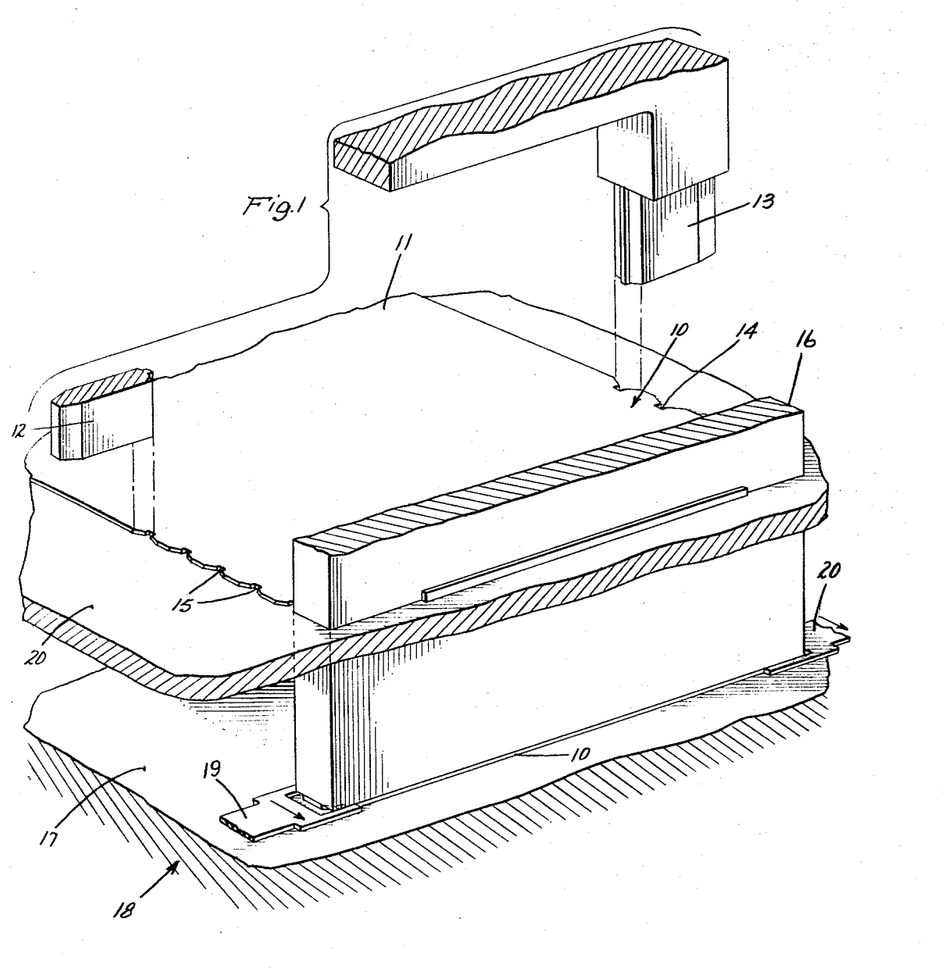
FIGURE 1 is a diagrammatic illustration of the initial step used in the improved process embodying one form of the invention, the initial step involving an operation wherein an elongated flat piece is cut from metallic strip material to a length equal to the desired circumferential length of the split ring.

The punch 16 is reciprocally driven by a press (not shown). On the downstroke the punch 16 cuts off the piece 10, and the piece 10 falls on the top surface 17 of the bolster 18. The surface 17 serves as the datum plane for the subsequent series of forming operations. The fingers 19 and 20 of a suitable transfer mechanism move the piece 10 along the datum plane 17 to the forming station shown in FIGURE 2.

Figure 2:
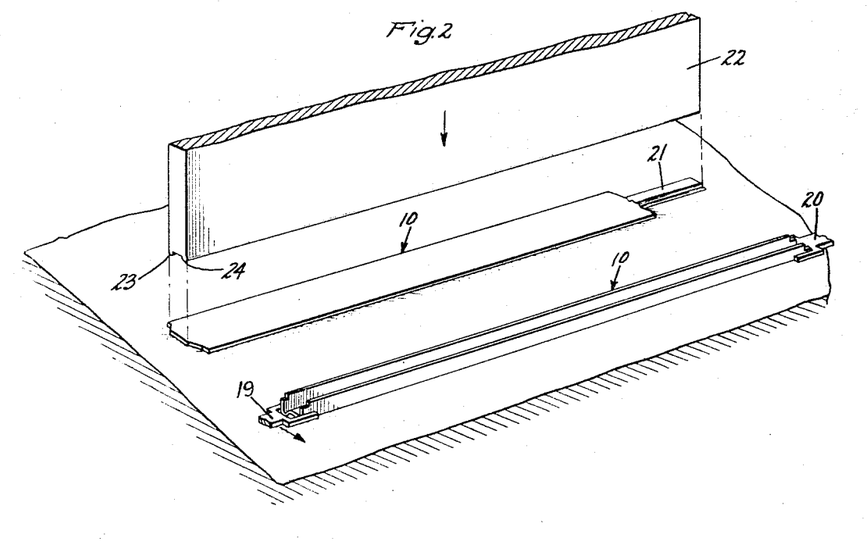
FIGURE 2 is a diagrammatic illustration of the step of forming the elongated flat piece into a channel-shaped piece in a spring-loaded forming die.
Figure 2A:
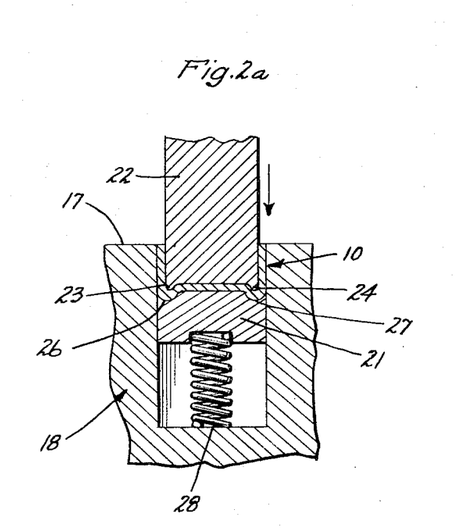
FIGURE 2a is a fragmentary sectional view of the apparatus shown in FIGURE 2 illustrating the press-actuated punch at the end of its downstroke travel with the piece forced against the forming die.
Figure 2B:
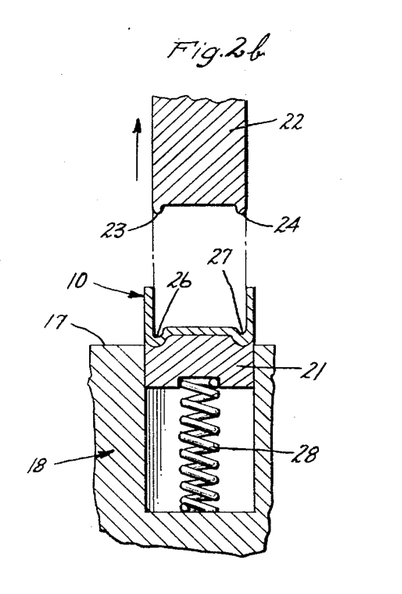
FIGURE 2b is a sectional view corresponding to the view shown in FIGURE 2a but illustrating the punch in the upstroke position after completion of the forming operation, the spring-loaded die having returned the channel-shaped piece to a preselected datum plane.

At the forming station shown in FIGURES 2, 2a and 2b, the piece 10 is positioned over the spring-loaded forming die 21 and under a press actuated punch 22. The punch 22 is formed with a pair of ribs 23, 24, and the forming die 21 is formed with a pair of complimentary depressions which cooperate to form a pair of grooves 26, 27 in the piece 10. On the downstroke punch 22 forces the piece 10 into the spring-loaded forming die 21 below the top surface or datum plane 17 to form the flat piece into a channel-shaped piece 10. As is best seen in FIGURE 2b when punch 22 is on the upstroke, a spring 28 returns the forming die 21 to its initial position where the channel-shaped piece 10 is at the top surface 17 of the bolster 18 where it can now be moved to the next operating station by fingers 19 and 20.

Figures 3, 3A, 3B, 3C:
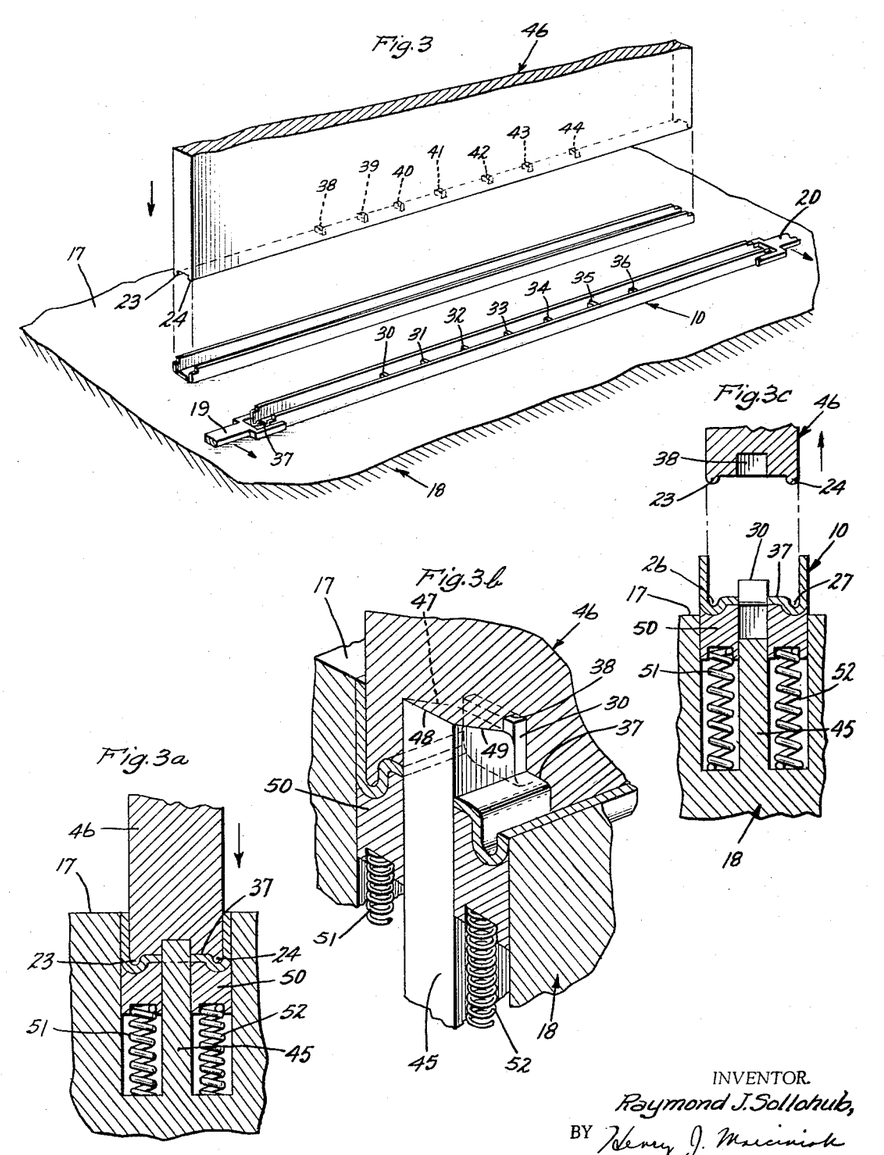
FIGURE 3 is a diagrammatic illustration showing the channel-shaped piece after its transfer along the datum plane to a second forming die which cuts out the tabs on the channed-shaped member, the punch being illustrated in a position at the beginning of its downstroke movement.
FIGURE 3a is a partial sectional view illustrating the punch and the spring-loaded forming die when the punch is in a position at the end of the downstroke movement.
FIGURE 3b is a perspective view, partly in section and enlarged, corresponding to the view illustrated in FIGURE 3a showing how the tabs are cut from the web portion of the channel-shaped piece.
FIGURE 3c is a sectional view corresponding to FIGURE 3a showing the punch and the channel-shaped piece after completion of the forming operation.

Having specific reference now to FIGURES 3, 3a, 3b and 3c, I will now describe how the tab-forming operation is carried out. It will be seen that the station illustrated therein a predetermined number of tabs 30, 31, 32, 33, 34, 35 and 36 are formed in the web portion 37 of the channel-shaped piece 10. A press-actuated punch 45 is formed with a number of apertures 38, 39, 40, 41, 42, 43 and 44 for receiving the punching elements 45 and the tabs. As is best seen in FIGURE 3b, each punching element 45 is provided with three cutting edges 47, 48 and 49, the element 45 being beveled so that a progressive cutting action is effected as the piece 10 is forced against the forming die 50.

As is shown in FIGURE 3a and 3b, when the press moves the punch 46 in a downward direction to the position as shown therein the punching element 45 is pushed through the web portion 37 of channel-shaped piece 10 to form the desired number of tabs. On the upstroke of the punch 46, the springs 51, 52 return the forming die 50 to a position where the tabbed channel-shaped piece 10 is aligned with the datum plane 17 or the top surface of the bolster 18. In this position the piece 10 can be readily transferred along the datum plane to the next forming station.

Figure 4:
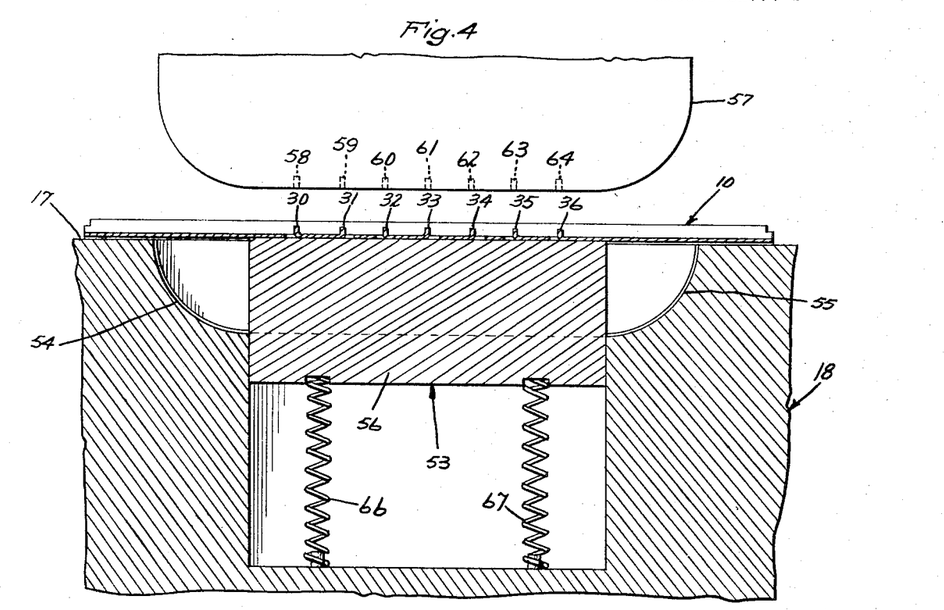
FIGURE 4 is a side sectional view of the third forming die and the bolster with the angulated piece in position over the forming die and the punch in position prior to its downstroke travel.
Figure 4A:
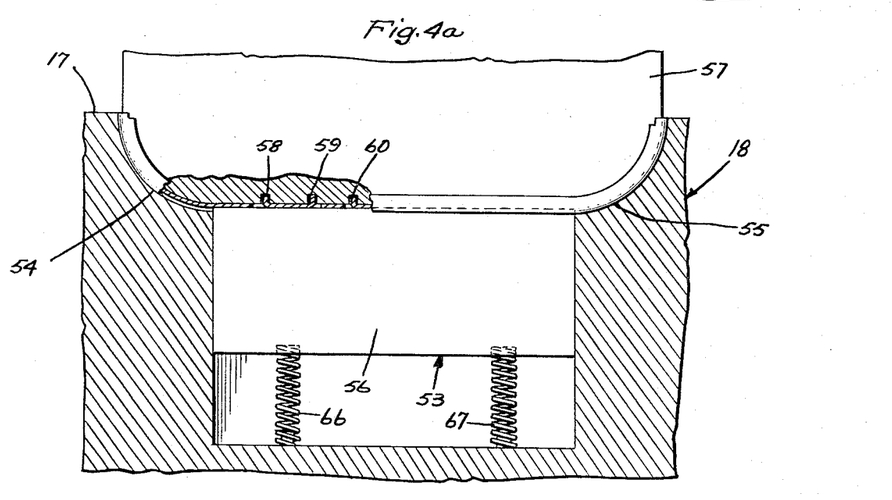
FIGURE 4a is a sectional view of the forming die and bolster showing the punch and the third forming die after the punch has completed its downward travel.
Figure 4B:
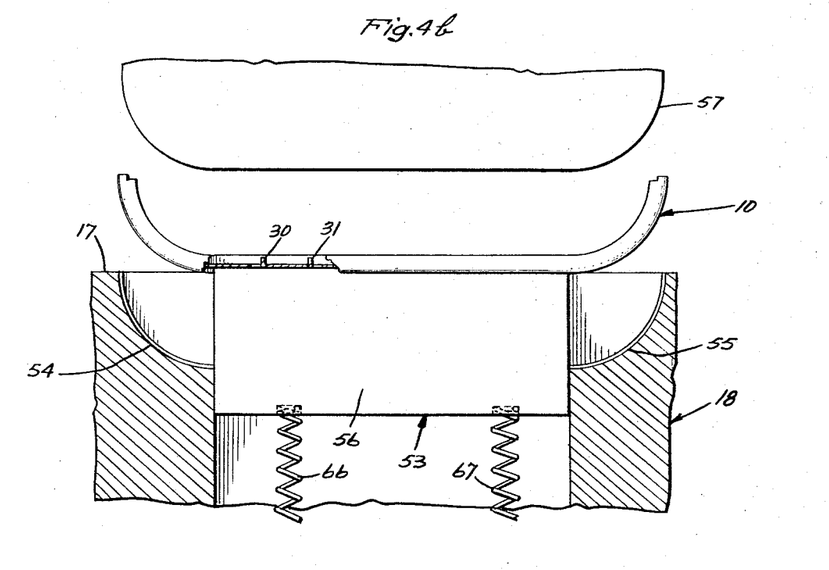
FIGURE 4b is a sectional view corresponding to the view shown in FIGURE 4 showing the work piece after completion of the forming operation at the third forming die.
Figure 4C:
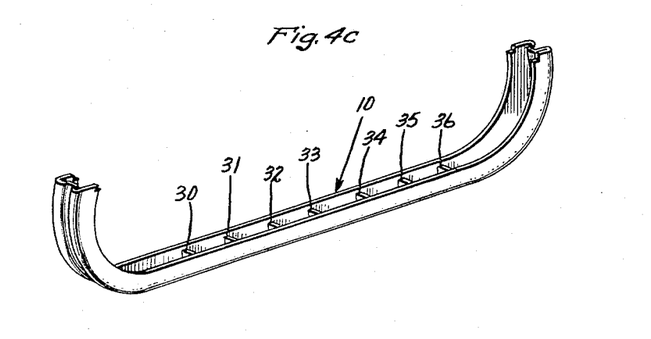
FIGURE 4c is a perspective illustration of the work piece illustrating the 90 degree bends formed at each end of the angulated channel-shaped piece.

At the next forming station shown in FIGURES 4, 4a and 4b we have provided a forming die 53 designed to form a 90 degree bend at each end of the channel-shaped piece 10 with a radius essentially equal to the predetermined radius of the split rimmed ring. It will be seen that the portions 54, and 55 of the forming die 53 are fixed and are shaped to form the desired angular curvature at the ends of the piece 10. The movable portion 56 is adapted to receive the channel-shaped piece 10 and to return the piece 10 to the datum plane 17 after the forming operation is completed. The press actuated punch 57 has seven slots 58, 59, 60, 61, 62, 63 and 64 adapted to receive the tabs 30, 31, 32, 33, 34, 35 and 36 respectively of the channel-shaped piece 10 in order to prevent them from being bent during the forming operation at this station. As in the other forming operations, the piece 10 is formed into an angulated piece 10 by effecting a downward movement of the punch 57 to force the piece 10 against the forming die 53. Thus, as will be seen in FIGURES 4b and 4c, the channel-shaped piece is formed into an angulated piece 10. On the upstroke of the punch 57, the springs 66 and 61 bias the movable portion 56 upwardly to cause the angulated channel-shaped piece 10 to return to the upper surface 17 of the bolster 18 where the piece can be readily transferred by a suitable transfer mechanism to the next station.

Figure 5:
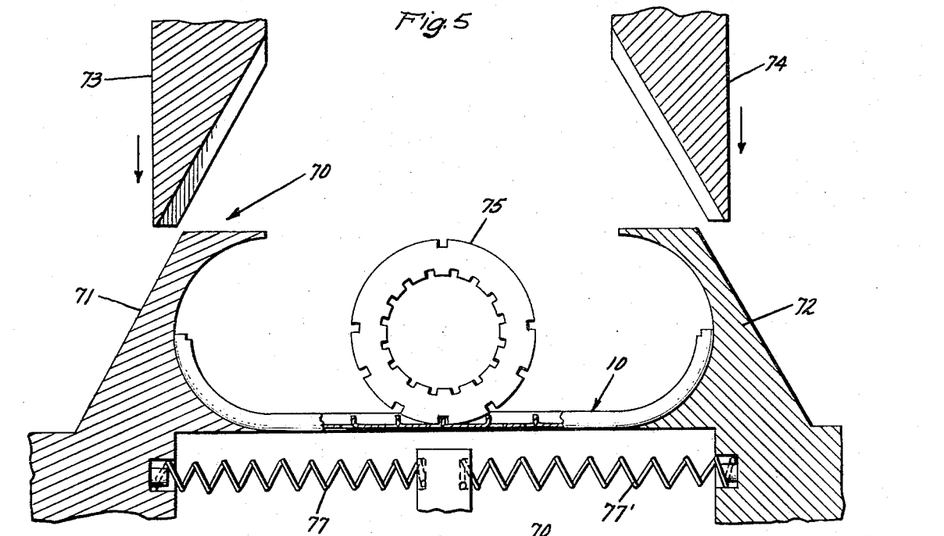
FIGURE 5 is a diagrammatic illustration of the forming die used to effect two more additional 90 degree bends in the angulated channel-shaped piece, the actuating members driven by the press being shown in position at the beginning of the downstroke travel of the press.
Figure 5A:
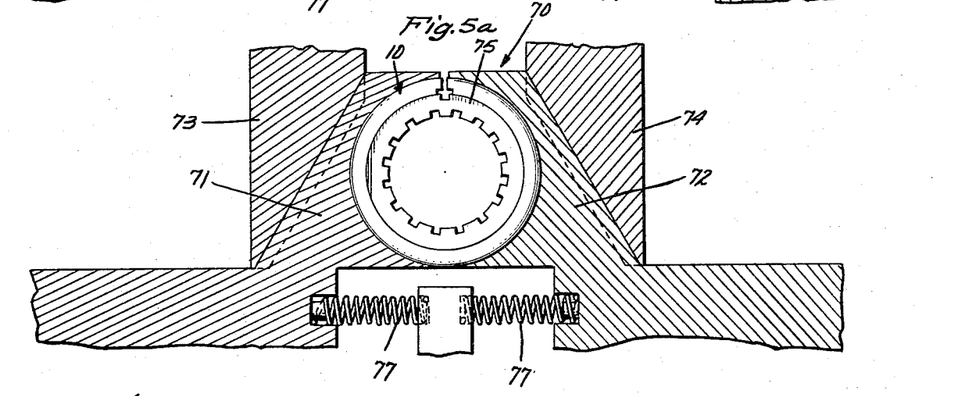
FIGURE 5a illustrates the forming die in position upon completion of the downward stroke of the actuating members and showing the split rimmed ring formed around a resilient annulus.
Figure 5B:
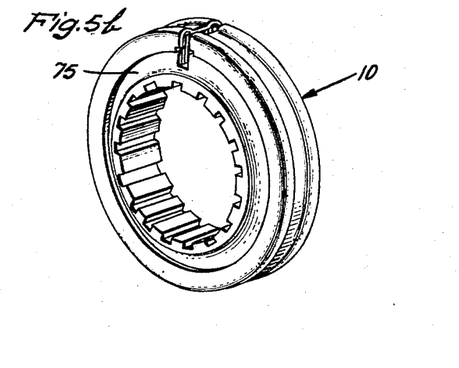
FIGURE 5b is an illustration in perspective of the split rimmed ring assembled on the resilient annulus.

The final forming operation is illustrated in FIGURES 5 and 5a. The angulated channel-shaped piece 10 is now positioned between a forming die 70 having a pair of laterally movable forming die sections 71 and 72. A downward movement of the press causes the pair of actuating or push members 73, 74 to effect a lateral movement of the die sections 71 and 72. This lateral movement of the die sections 71 and 72 causes two more 90 degree bends to be formed in the piece 10 thereby forming the desired split rimmed ring 10 around a resilient annulus 75. On the upward stroke of the press the die sections 71, 72 are biased away from the assembly of the ring 10 and annulus 75 by springs 77 and 77'. Preferably, the final forming step is carried out to form the ring 10 around the resilient annulus 75. This results in the advantage that two assembly steps are combined into one.

Figure 6:
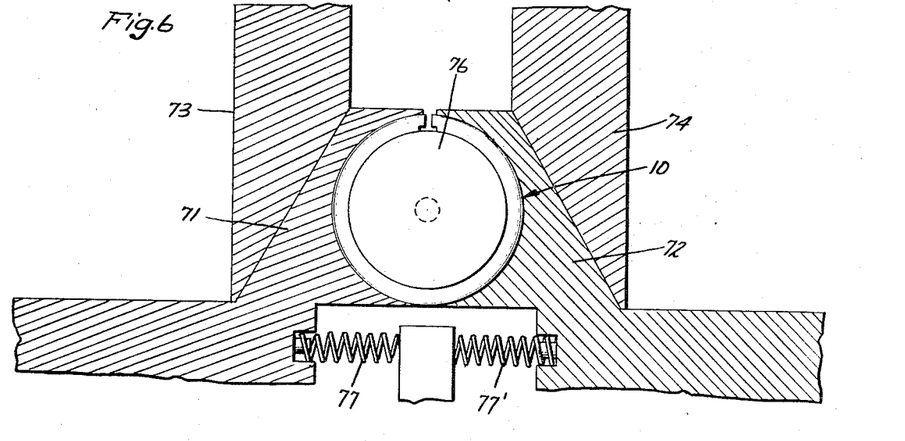
FIGURE 6 illustrates a modification of the step carried out in the forming die operation illustrated in FIGURE 5 wherein the angulated piece is bent to its final circular shape around a horn.

In FIGURE 6 I have shown a modification of the final forming operation wherein the ring 10 is formed around a horn 76 having a diameter equal to the inner diameter of the ring 10. When the push members 73, 74 are forced downwardly by the press the die sections 71, 72 move inwardly to form the ring 10 around the horn 76. On the upward stroke of the press the die sections 71, 72 are biased outwardly by spring 77 and 77'.

Figure 7:
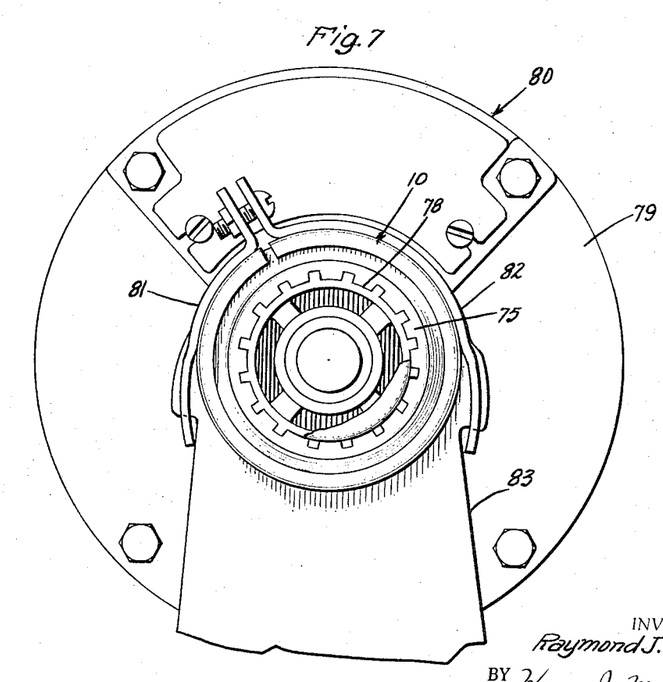
FIGURE 7 is an illustration of an end view of a fractional horsepower motor utilizing the split rimmed ring assembly fabricated in accordance with the improved process of the invention.

Having specific reference now to FIGURES 7, I have shown the assembly of the ring 10 and resilient annulus 75 supporting the hub 78 of end shield 79 of a fractional horsepower motor 80. It will be seen that the ring 10 is clamped by means of suitable clamping elements 81 and 82 to a U-shaped support base 83. Although the split rimmed ring 10 used in the illustrated embodiment of the invention was used in a motor application, it will be apparent that the rimmed ring may be used in other applications where a split rimmed ring with tabs is required.

From the foregoing description of the improved method for forming a tabbed split rimmed ring, it will be apparent that the method is readily adapted to semi-automated methods since the work piece in its various forming stages is brought to the same datum plane. This provides the important advantage that the work piece can be readily transferred from one station to another by a transfer mechanism thereby eliminating the need for manual handling of the work piece.

Although I have described my invention in connection with a specific embodiment thereof, it will be appreciated that many modifications may be made thereto without actually departing from the invention. It is, therefore, intended in the appended claims to cover all such equivalent variations that come within the true spirit and scope of the invention.

What I claim as new and desire to secure by Letters Patent of the United States is:

1. A process for making a split rimmed ring having a predetermined radius and circumferential length and carrying a resilient annulus, said process comprising the steps of: cutting an elongated flat piece from metallic strip material, said elongated flat piece having a length essentially equal to the predetermined circumferential length of the ring, forming said flat metallic piece into a channel-shaped piece, punching a plurality of spaced apart tabs along at least a portion of said channel-shaped piece, forming an essentially 90 degree bend at each end of said channel-shaped piece to provide an angulated piece, said 90 degree bends having a radius essentially equal to the predetermined radius of the ring, supporting the resilient annulus adjacent the channel-shaped piece intermediate the ends thereof, the resilient annulus having at least as many tab-receiving notches spaced about a portion of the periphery thereof as the number of tabs in said channel-shaped piece, and forming two additional 90 degree bends to shape said angulated piece into a split rimmed ring of said predetermined radius about said resilient annulus, with the tabs of said split rimmed ring being located in respective notches in said resilient annulus.

2. A process for making a split rimmed ring having a predetermined radius and a predetermined circumferential length, said process comprising the steps of: forming a flat elongated piece from metallic material having a length equal to the predetermined circumferential length of the ring, forming said flat elongated piece into a channel-shaped piece with generally parallel side walls and a connecting web portion having a plurality of tabs along at least a portion thereof, said tabs extending at right angles from the web portion and in the same direction as the side walls of said channel-shaped piece, forming said channel-shaped piece into an angulated channel-shaped piece having a 90 degree bend at each end with a radius essentially equal to the predetermined radius of the ring, and forming said angulated channel-shaped piece into the split rimmed ring of said predetermined radius.

3. A process for making split rimmed rings having a predetermined radius and circumferential length, said process comprising the steps of: supporting a flat elongate work piece having a length essentially equal to the predetermined circumferential length of the ring on the surface of the bolster, said surface lying in a preselected datum plane, forming a channel-shaped piece in a spring-loaded die from said flat elongated work piece, said spring-loaded die returning said channel-shaped piece to said datum plane, transferring said channel-shaped piece along said datum plane to a second spring-loaded die, forming in said second spring-loaded die a plurality of tabs on said channel-shaped piece, said second spring-loaded die returning said tabbed channel-shaped piece to the datum plane, transferring said tabbed channel-shaped piece along said datum plane to a third die, forming said tabbed channel-shaped piece into an angulated channel-shaped piece having a 90 degree bend at each end with a radius essentially equal to the predetermined radius of the ring, said third die returning said angulated channel-shaped piece to said preselected datum plane, transferring said angulated channel-shaped piece along said datum plane to a fourth die, and forming said angulated channel-shaped piece into a split rimmed ring of said predetermined radius.

4. A process for making a split rimmed ring carrying a resilient annulus having a plurality of circumferentially spaced tab-receiving notches, said ring having a predetermined radius and circumferential length, said process comprising the steps of: forming a flat piece from metallic strip material, said flat piece having a length essentially equal to the predetermined circumferential length of the ring, forming a channel-shaped piece from said flat piece, said channel-shaped piece having a web portion and sidewalls, cutting out a plurality of tabs from said web portion of said channel-shaped piece, forming said tabbed channel-shaped piece into an angulated piece having at each end an essentially 90 degree bend of said predetermined radius, supporting the resilient annulus substantially adjacent said tabbed channel-shaped piece, and forming two more 90 degree bends in said angulated piece to shape said angulated piece into a split rimmed ring about said resilient annulus with said tabs residing in respective tab-receiving notches of said resilient annulus.

5. A process for making a split rimmed ring having a predetermined radius and circumferential length and carrying a resilient annulus, said process comprising the steps of: forming a flat elongated strip from metallic material having a length equal to the predetermined circumferential length of the ring, forming said flat elongated piece into a channel-shaped piece with side walls and a web portion, forming said channel-shaped piece into an angulated channel-shaped piece having a 90 degree bend at each end with a radius essentially equal to the predetermined radius of the split rimmed ring, supporting the resilient annulus generally adjacent said angulated channel-shaped piece between the ends thereof, and forming two more 90 degree bends in said angulated piece to shape said angulated piece into a split rimmed ring of said predetermined radius about said resilient annulus, with said resilient annulus thereby being carried between said side walls of said channel-shaped piece.

6. A process for making split rimmed rings having a predetermined radius and circumferential length, said process comprising the steps of: forming a channel-shaped piece from a flat elongated piece of metallic material at a first forming station, said channel-shaped piece having a length essentially equal to the predetermined circumferential length of the ring, causing said channel-shaped piece to be returned to a preselected datum plane upon completion of the first forming operation, transferring the channel-shaped piece along the datum plane to a second forming station, forming a plurality of tabs on said channel-shaped piece, causing the tabbed channel-shaped piece to be returned to the preselected said angulated channel-shaped piece to a fourth forming operation, transferring said tabbed channel-shaped piece along the datum plane to a third forming station, forming said tabbed channel-shaped piece at said third forming station into an angulated channel-shaped piece having a 90 degree bend at each end thereof with a radius essentially equal to the predetermined radius of the ring, causing said angulated channel-shaped piece to be returned to said preselected datum plane upon completion of the forming operation at said third station, transferring said angulated channel-shaped piece ot a fourth forming station, and forming said angulated channel-shaped piece into a split rimmed ring of said predetermined radius.

References Cited by the Examiner

UNITED STATES PATENTS

| | | | |
|---|---|---|---|
| 1,837,902 | 12/1931 | Galassi | 72—338 |
| 1,931,162 | 10/1933 | Kranz et al. | 29—477 |
| 2,099,624 | 11/1937 | Robarge | 72—338 X |
| 2,591,483 | 4/1952 | West | 72—338 X |
| 2,613,743 | 10/1952 | Bangerter | 72—325 X |

WILLIAM W. DYER, Jr., *Primary Examiner.*

LEONIDAS VLACHOS, *Examiner.*